(12) United States Patent
Vermani et al.

(10) Patent No.: US 8,743,863 B2
(45) Date of Patent: Jun. 3, 2014

(54) METHOD FOR RANGING DEVICES USING CODE SEQUENCES IN WLANS

(75) Inventors: Sameer Vermani, San Diego, CA (US); Hemanth Sampath, San Diego, CA (US); Alok Aggarwal, Foster City, CA (US); Simone Merlin, Solesino (IT)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 12/365,791

(22) Filed: Feb. 4, 2009

(65) Prior Publication Data

US 2010/0046491 A1 Feb. 25, 2010

Related U.S. Application Data

(60) Provisional application No. 61/090,515, filed on Aug. 20, 2008.

(51) Int. Cl.
*H04J 3/06* (2006.01)
*H04J 11/00* (2006.01)

(52) U.S. Cl.
USPC .......................................... 370/350; 370/209

(58) Field of Classification Search
None
See application file for complete search history.

(56) References Cited

U.S. PATENT DOCUMENTS

| | | | |
|---|---|---|---|
| 6,999,025 B2 | 2/2006 | Poullin | |
| 7,072,289 B1* | 7/2006 | Yang et al. | 370/208 |
| 8,351,538 B2* | 1/2013 | Nakao et al. | 375/295 |
| 8,649,366 B2* | 2/2014 | Park et al. | 370/350 |
| 2005/0030931 A1* | 2/2005 | Sung et al. | 370/342 |
| 2007/0060180 A1 | 3/2007 | Muharemovic et al. | |
| 2008/0285433 A1* | 11/2008 | Akita et al. | 370/204 |
| 2008/0291820 A1* | 11/2008 | Lim et al. | 370/209 |
| 2009/0003308 A1* | 1/2009 | Baxley et al. | 370/350 |
| 2009/0080547 A1 | 3/2009 | Naka et al. | |
| 2009/0268602 A1* | 10/2009 | Han et al. | 370/208 |

FOREIGN PATENT DOCUMENTS

| | | |
|---|---|---|
| CN | 1798053 A | 7/2006 |
| JP | 2007124632 A | 5/2007 |
| JP | 2008515268 A | 5/2008 |
| TW | 200733759 | 9/2007 |
| WO | 2006035563 A1 | 4/2006 |
| WO | 2007023524 A1 | 3/2007 |

OTHER PUBLICATIONS

"International Search Report and Written Opinion—PCT/US2009/053693—ISA/EPO—Jan. 26, 2010".
Jae Joon Park et al: "Uplink Packet Synchronization of OFDMA Systems" 2006 IEEE 64th Vehicular Technology Conference: VTC 2006-Fall; Sep. 25-28, 2006, Montreal, Quebec, Canada, Piscataway, NJ: IEEE Operations Center, Sep. 1, 2006, pp. 1-5, XP031051327 ISBN:978-1-4244-0062-1 pp. 2-3, section II.A.
Taiwan Search Report—TW098127916—TIPO—Oct. 9, 2012.

* cited by examiner

*Primary Examiner* — Warner Wong
(74) *Attorney, Agent, or Firm* — Eric Ho

(57) ABSTRACT

Methods and apparatus for using code-division multiple access (CDMA) to transmit information via orthogonal frequency-division multiplexing (OFDM) to convey information from user terminals to an access point (AP) in a wireless local area network (WLAN) are provided. By using CDMA to convey information, a propagation delay between an access point (AP) and a user terminal may be determined by the AP, and timing adjustment information based on the delay may be sent to the user terminal. In this manner, subsequent uplink (UL) transmissions from multiple user terminals may be received simultaneously by the AP, despite the multiple user terminals having potentially different propagation delays.

91 Claims, 13 Drawing Sheets

METHOD FOR RANGING DEVICES USING CODE SEQUENCES IN WLANS

CROSS-REFERENCE TO RELATED APPLICATION

This application claims benefit of U.S. Provisional Patent Application Ser. No. 61/090,515 filed Aug. 20, 2008, which is herein incorporated by reference in its entirety.

FIELD

Embodiments of the present disclosure generally relate to wireless communications and, more particularly, to using code-division multiple access (CDMA) to transmit information via orthogonal frequency-division multiplexing (OFDM) in wireless local area networks (WLANs).

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems. SDMA techniques may be adopted in several emerging wireless communications standards such as IEEE 802.11 (IEEE is the acronym for the Institute of Electrical and Electronic Engineers, 3 Park Avenue, 17th floor, New York, N.Y.) and Long Term Evolution (LTE).

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial channels, where, for all practical purposes, $N_S \leq \min\{N_T, N_R\}$. The $N_S$ spatial channels may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S \leq \min\{N_T, \text{sum}(N_R)\}$, where $\text{sum}(N_R)$ represents the summation of all user terminal receive antennas. When SDMA is transmitted to an access point, $N_S \leq \min\{\text{sum}(N_T), N_R\}$, where $\text{sum}(N_T)$ represents the summation of all user terminal transmit antennas.

SUMMARY

Certain embodiments of the present disclosure provide a method for ranging a device in a wireless communications system. The method generally includes transmitting a plurality of orthogonal frequency-division multiplexing (OFDM) symbols representing a code sequence in an OFDM frame, receiving timing information from an access point (AP), the timing information based on when the plurality of OFDM symbols was received by the AP, and using the timing information to control a start time of a subsequent uplink (UL) transmission.

Certain embodiments of the present disclosure provide a computer-program product for ranging a device in a wireless communications system. The computer-program product typically includes a computer-readable medium having instructions stored thereon, the instructions being executable by one or more processors. The instructions generally include instructions for transmitting a plurality of OFDM symbols representing a code sequence in an OFDM frame, instructions for receiving timing information from an AP, the timing information based on when the plurality of OFDM symbols was received by the AP, and instructions for using the timing information to control a start time of a subsequent UL transmission.

Certain embodiments of the present disclosure provide an apparatus for wireless communications. The apparatus generally includes means for transmitting a plurality of OFDM symbols representing a code sequence in an OFDM frame, means for receiving timing information from an AP, the timing information based on when the plurality of OFDM symbols was received by the AP, and means for using the timing information to control a start time of a subsequent UL transmission.

Certain embodiments of the present disclosure provide a mobile device. The mobile device generally includes a transmitter configured to transmit a plurality of OFDM symbols representing a code sequence in an OFDM frame, a receiver configured to receive timing information from an AP, the timing information based on when the plurality of OFDM symbols was received by the AP, and logic for using the timing information to control a start time of a subsequent UL transmission.

Certain embodiments of the present disclosure provide a wireless communications system. The system generally includes a user terminal configured to transmit a plurality of OFDM symbols representing a code sequence in an OFDM frame; and an AP configured to receive the plurality of symbols in the OFDM frame, perform correlation to detect the code sequence from the plurality of OFDM symbols, determine timing information based on the correlation and when the plurality of OFDM symbols was received by the AP, and transmit the timing information such that the user terminal may use the timing information to control a start time of a subsequent UL transmission.

Certain embodiments of the present disclosure provide a wireless communications system. The system generally includes a plurality of user terminals, wherein each user terminal is configured to transmit a plurality of OFDM symbols representing a code sequence in an OFDM frame such that a plurality of OFDM frames are simultaneously transmitted by the plurality of user terminals; and an AP configured to receive the plurality of OFDM frames and, for each received OFDM frame in the plurality of OFDM frames, configured to perform correlation to detect the code sequence from the plurality of OFDM symbols in the OFDM frame, determine timing information based on the correlation and on when the plurality of OFDM frames was received by the AP, and transmit the timing information such that the plurality of user terminals may use the timing information for each of the plurality of user terminals to control start times of subsequent UL transmissions to be simultaneously received by the AP.

Certain embodiments of the present disclosure provide a method for ranging multiple devices in a wireless communications system. The method generally includes transmitting a plurality of OFDM symbols in an OFDM frame, receiving timing information from an AP, the timing information based on when the plurality of OFDM symbols was received by the AP, and using the timing information to control a start time of a subsequent UL transmission such that one or more other UL transmissions from one or more other stations reach the AP at the same time as the subsequent UL transmission.

Certain embodiments of the present disclosure provide a method for ranging a device in a wireless communications system. The method generally includes receiving a UL signal based on an OFDM frame having a plurality of OFDM symbols, performing correlation to detect one or more code sequences from the plurality of OFDM symbols, determining timing adjustment information based on the correlation, and transmitting the timing adjustment information.

Certain embodiments of the present disclosure provide a computer-program product for ranging a device in a wireless communications system. The computer-program product typically includes a computer-readable medium having instructions stored thereon, the instructions being executable by one or more processors. The instructions generally include instructions for receiving a UL signal based on an OFDM frame having a plurality of OFDM symbols, instructions for performing correlation to detect one or more code sequences from the plurality of OFDM symbols, instructions for determining timing adjustment information based on the correlation, and instructions for transmitting the timing adjustment information.

Certain embodiments of the present disclosure provide an apparatus for wireless communications. The apparatus generally includes means for receiving a UL signal based on an OFDM frame having a plurality of OFDM symbols, means for performing correlation to detect one or more code sequences from the plurality of OFDM symbols, means for determining timing adjustment information based on the correlation, and means for transmitting the timing adjustment information.

Certain embodiments of the present disclosure provide an AP for wireless communications. The access point generally includes a receiver configured to receive a UL signal based on an OFDM frame having a plurality of OFDM symbols, logic for performing correlation to detect one or more code sequences from the plurality of OFDM symbols, logic for determining timing adjustment information based on the correlation, and a transmitter configured to transmit the timing adjustment information.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments of the present disclosure provide techniques and apparatus for using code-division multiple access (CDMA) via orthogonal frequency-division multiplexing (OFDM) to convey information from user terminals to an access point (AP) in a wireless local area network (WLAN), for example, in an effort to acquire timing information from a large number of user terminals in a short duration. Useful for ranging and power control, this CDMA-based scheme may be scalable to a great number of user terminals and may be very robust to multiple frequency offsets of different user terminals.

The word "exemplary" is used herein to mean "serving as an example, instance, or illustration." Any embodiment described herein as "exemplary" is not necessarily to be construed as preferred or advantageous over other embodiments. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
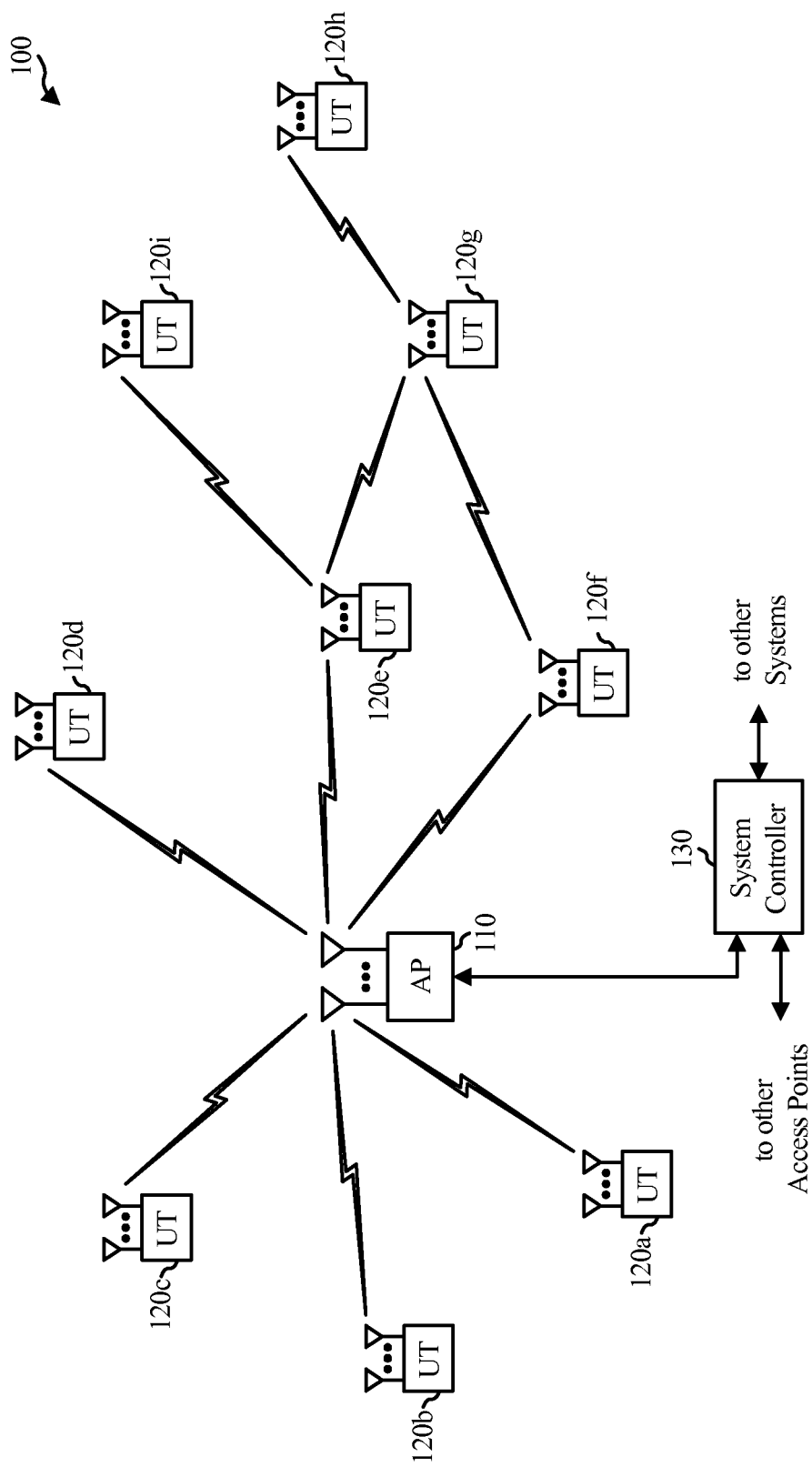
FIG. 1 illustrates a spatial division multiple access (SDMA) multiple-input multiple-output (MIMO) wireless system, in accordance with certain embodiments of the present disclosure.

FIG. 1 shows a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via spatial division multiple access (SDMA), for certain embodiments, the user terminals 120 may also include some user terminals that do not support SDMA. Thus, for such embodiments, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
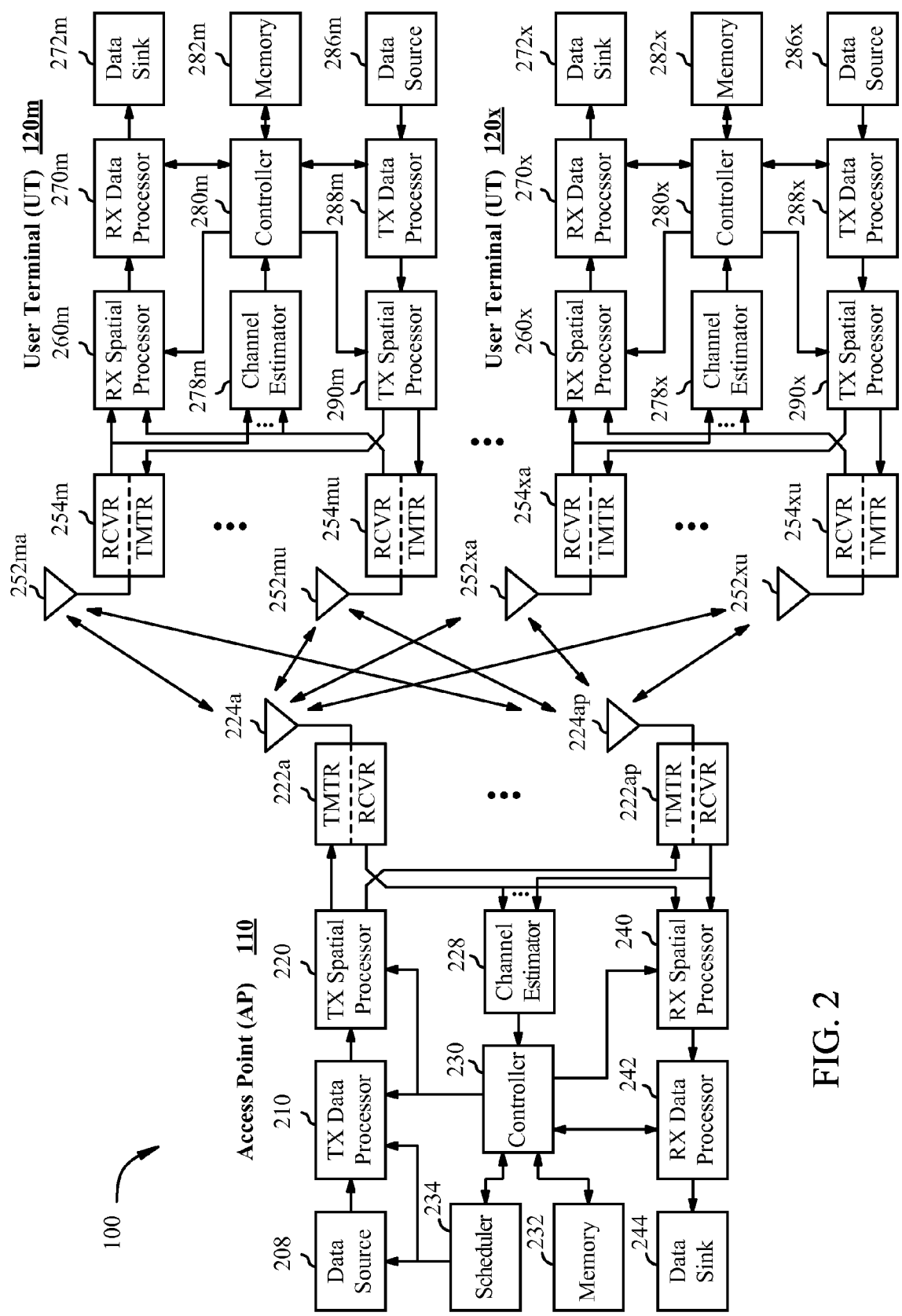
FIG. 2 illustrates a block diagram of an access point (AP) and two user terminals, in accordance with certain embodiments of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
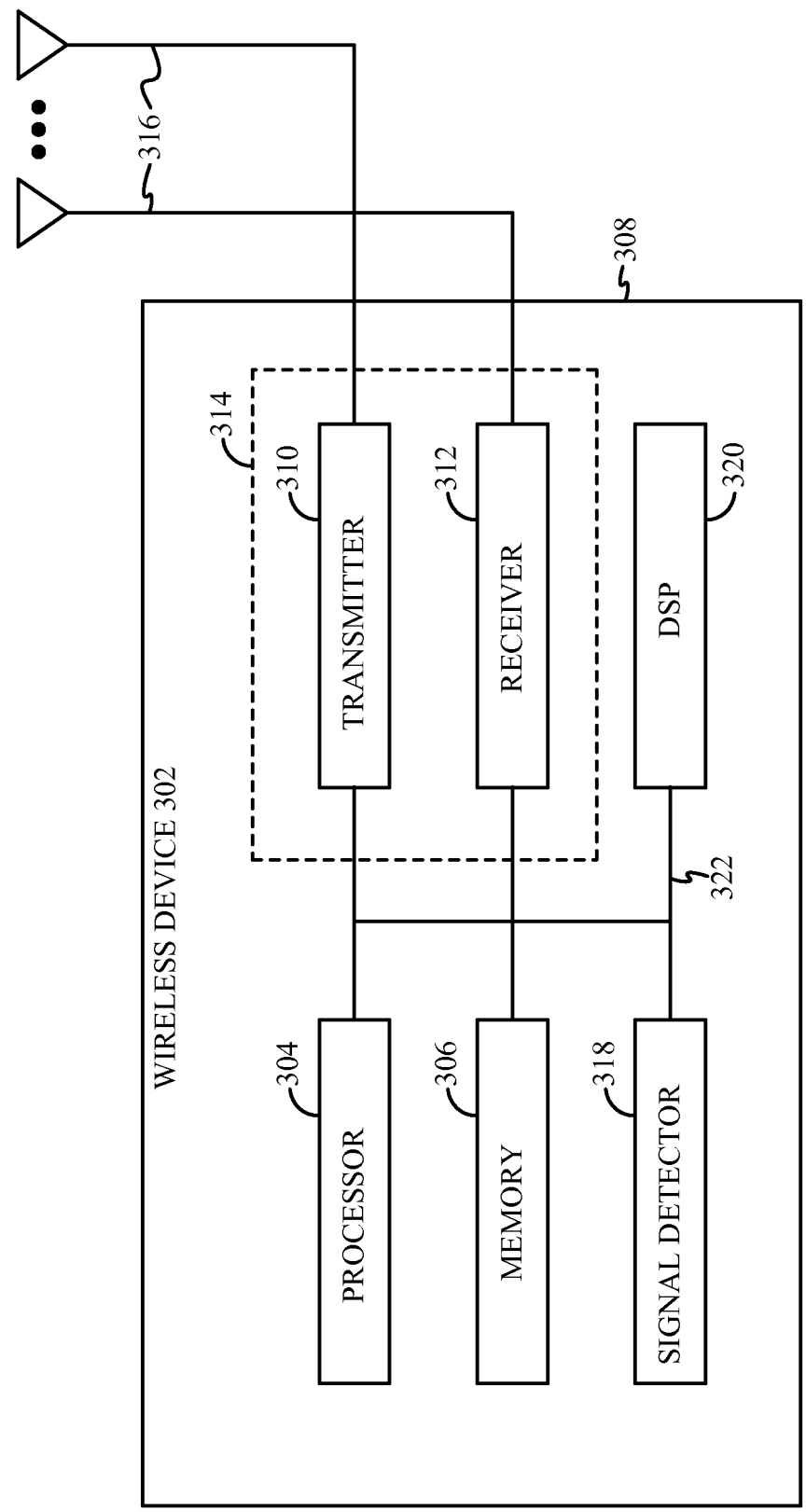
FIG. 3 illustrates various components that may be utilized in a wireless device, in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Using CDMA to Send Uplink Signals in WLANs

In future wireless local area network (WLAN) systems, user terminals may be required to request for resources before every uplink SDMA transmission. Using a contention-based scheme without access point (AP) feedback at the end may be used, but this scheme is inefficient in terms of the time it takes to get a certain number of requests through. This is because a high number of slots may be required to ensure a low number of collisions. A scheme with AP feedback may allow for collisions, but is still not efficient when few users request for resources.

Furthermore, multiple user terminals trying to access the network simultaneously creates problems for a wireless communications system and, more specifically, for an AP. For example, it may be desirable to time synchronize the multiple user terminals at the AP simultaneously. The ability to send a small number of information bits on a channel may also be desired. This information may be used, for example, for sending allocation indication (AI), which carries requests for resources (REQs). As another example, the information may include channel quality indicator (CQI) information. As yet another example, channel estimation at the AP may be performed by sending a pilot sequence.

Accordingly, what are needed are techniques and apparatus for a multiple access scheme which scales well with the number of users and does not incur too much overhead.

One option might be to use orthogonal frequency-division multiple access (OFDMA). With OFDMA, each user terminal gets a dedicated block of frequency resources, which tends to limit the number of user terminals which can access the system simultaneously due to diversity issues. For an example of 64 user terminals, assigning one tone to each user terminal yields very poor diversity. Also, the AP may need to communicate the frequency blocks each user terminal may use for transmission. Furthermore, if the block size is fixed, a user terminal not being there is just a wasted resource.

A second option may be to use CDMA for transmitting the uplink information. With CDMA, the user terminals may get full degrees of freedom at the expense of a signal-to-interference-plus-noise ratio (SINR) degradation. However, processing gain may compensate for any SINR degradation. Furthermore, one user terminal not transmitting benefits all other users by bringing the interference level down. This may lead to a graceful degradation with the number of user terminals. In other words, a CDMA-based scheme can support a large number of user terminals in a relatively low number of slots without suffering from having a small number of user terminals. Moreover, no scheduling information is needed with a CDMA solution.

Therefore, the basic mechanism behind certain embodiments of the present disclosure may involve a user terminal employing CDMA to transmit a request/ranging message to the AP in a period called the CDMA control opportunity. The AP may respond by telling the user terminal to advance or retard timing by a certain number of samples and may also send feedback for resource allocation. The information sent may include any suitable uplink message, such as a resource request (REQ), a channel quality indicator (CQI), a beamforming metric, or other metric variants pertaining to channel quality. For some embodiments, the information may be a known pilot sequence. Different values of CQI or REQ may be conveyed by employing different indices (e.g., Walsh indices), where each index refers to a different CQI or REQ value.

Although embodiments of the present disclosure refer to Walsh sequences and indices, any suitable N-bit code sequence and corresponding indices may be used. For example, certain embodiments may derive the N-bit code sequence from an IEEE 802.11b waveform. As another example, certain embodiments may use a Barker sequence or a modified Barker sequence.

Furthermore, since multiple user terminals may be transmitting information simultaneously, the user terminals may be differentiated through quadrature phase-shift keying (QPSK) scrambling. In other words, after a Walsh sequence is selected, the sequence may be multiplied with a complex QPSK scrambling sequence. The scrambling seed used to generate the scrambling sequence may be station ID dependent (i.e., dependent on the identification number of the user terminal).

Figure 4:
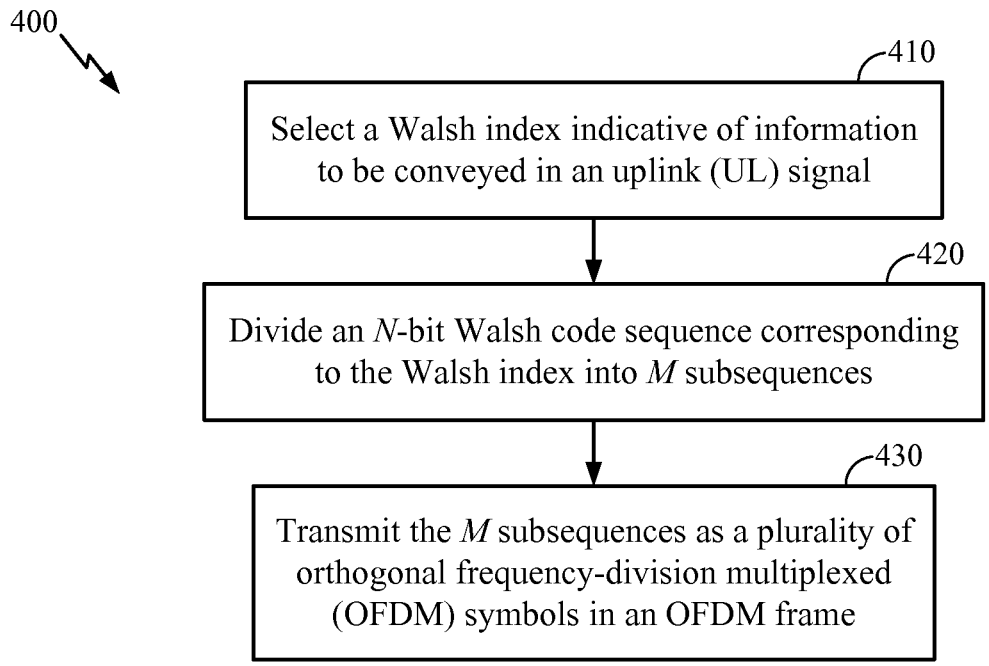
FIG. 4 is a flow diagram of example operations for conveying information in a wireless communications system using code-division multiple access (CDMA) from the perspective of a user terminal, in accordance with certain embodiments of the present disclosure.

FIG. 4 is a flow diagram of example operations 400, from the perspective of a user terminal, for conveying information in a wireless communications system using CDMA. The operations 400 may begin, at 410, by selecting a Walsh index indicative of information to be conveyed in an uplink (UL) signal. The information to be conveyed may be any suitable UL information, such as a channel quality indicator (CQI) or a resource request (REQ). The UL signal may comprise one or more signals transmitted from a user terminal 120 to an AP 110 (in an infrastructure mode of deployment) or from one STA to one or more other STAs (in a peer-to-peer application mode or ad hoc deployment).

At 420, an N-bit Walsh code sequence corresponding to the Walsh index may be divided into M Walsh code subsequences. At 430, the M subsequences may be transmitted as a plurality of orthogonal frequency-division multiplexing (OFDM) symbols in an OFDM frame.

Figure 5:
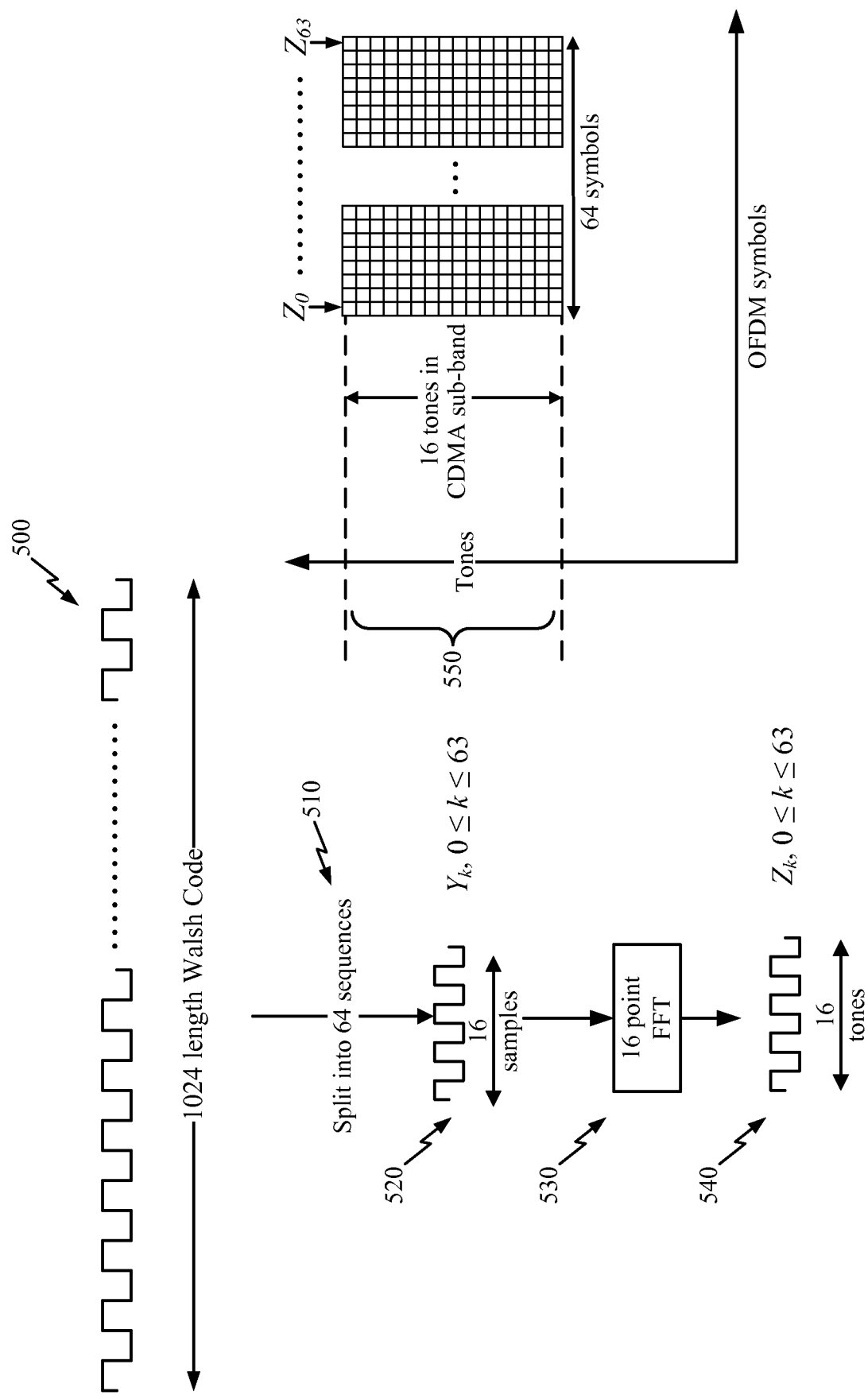
FIG. 5 illustrates converting CDMA information to orthogonal frequency-division multiplexing (OFDM) symbols, in accordance with certain embodiments of the present disclosure.

FIG. 5 illustrates converting CDMA information to OFDM symbols, as a graphical example of the operations 400 of FIG. 4. For example, a Walsh code sequence 500 having a length of N=1024 bits and comprising any suitable sequence of digital 0's and 1's may be split into M=64 subsequences ($Y_k$, $0 \leq k \leq 63$) at 510, each sequence having 16 samples 520. At 530, a fast Fourier transform (FFT) or a discrete Fourier transform (DFT) may be applied to each of the 64 subsequences such that each subsequence generates 16 tones at 540. The 16 tones for each subsequence may correspond to an OFDM symbol, such that the 64 subsequences may produce 64 OFDM symbols ($Z_k$, $0 \leq k \leq 63$) to be transmitted in 16 tones of a CDMA sub-band 550. In other words, the 64 subsequences may be transmitted by transmission spanning 64 OFDM symbols.

Figure 6:
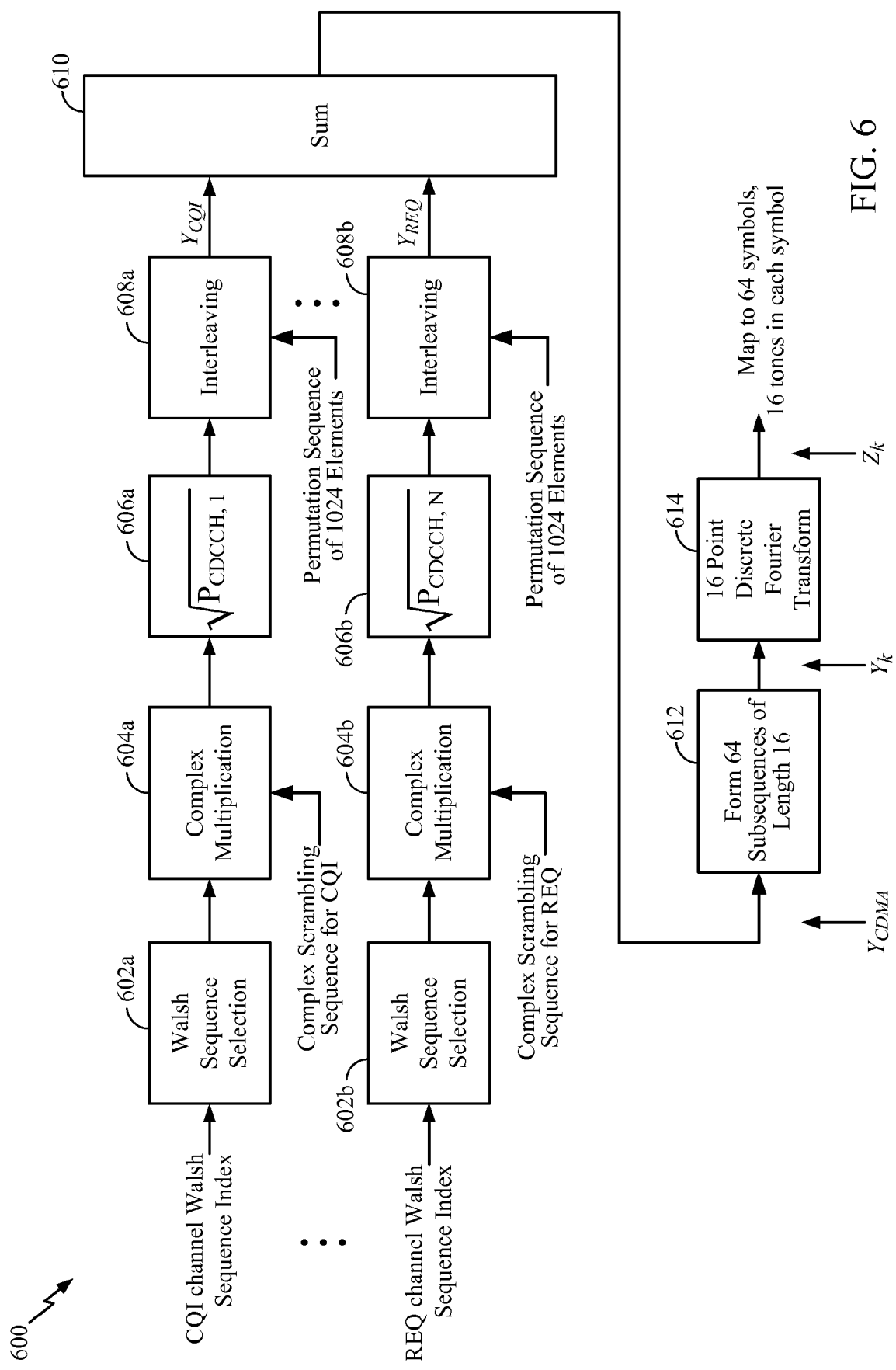
FIG. 6 is a block diagram of an architecture for conveying channel quality indicator (CQI) and resource requests using CDMA, in accordance with certain embodiments of the present disclosure.

FIG. 6 is an example block diagram 600 of a proposed architecture for conveying uplink information, such as channel quality indicator (CQI) and resource requests (REQs) using CDMA, according to certain embodiments of the present disclosure. A Walsh index, representative of the information to be conveyed, may be input to a Walsh sequence selection block 602 to select a Walsh sequence. The output Walsh sequence may be scrambled (e.g., QPSK scrambled) by a complex multiplication block 604 such that different user terminals use different scramblings. The scrambled sequence may be input to a power measuring/adjustment block 606. For some embodiments, the output of the power block 606 may be input to an interleaving block 608. The interleaving block 608 may interleave the output of the power block 606 with a permutation sequence of 1024 elements, for example.

In any event, the processed digital signal ($Y_{CQI}$ or $Y_{REQ}$) for each message may be summed in a summing block 610, and the sum ($Y_{CDMA}$) may be divided into subsequences at block 612. For example, block 612 may divide the sum into 64 subsequences with a length of 16 samples. The subsequences ($Y_k$) may be sent to an FFT block (not shown) or a discrete Fourier transform (DFT) block 614 to be transformed into tones, which may be transmitted as OFDM symbols ($Z_k$). As illustrated in FIG. 6, the DFT block 614 may be a 16-point DFT block to transform 64 subsequences of length 16 into 64 OFDM symbols, each symbol having 16 tones. Although only two processing paths for UL information are portrayed in the block diagram 600, any suitable number of processing paths may be included in the architecture such that a corresponding number of processed Walsh indices may be summed by the summing block 610 to form sum $Y_{CDMA}$.

Figure 7:
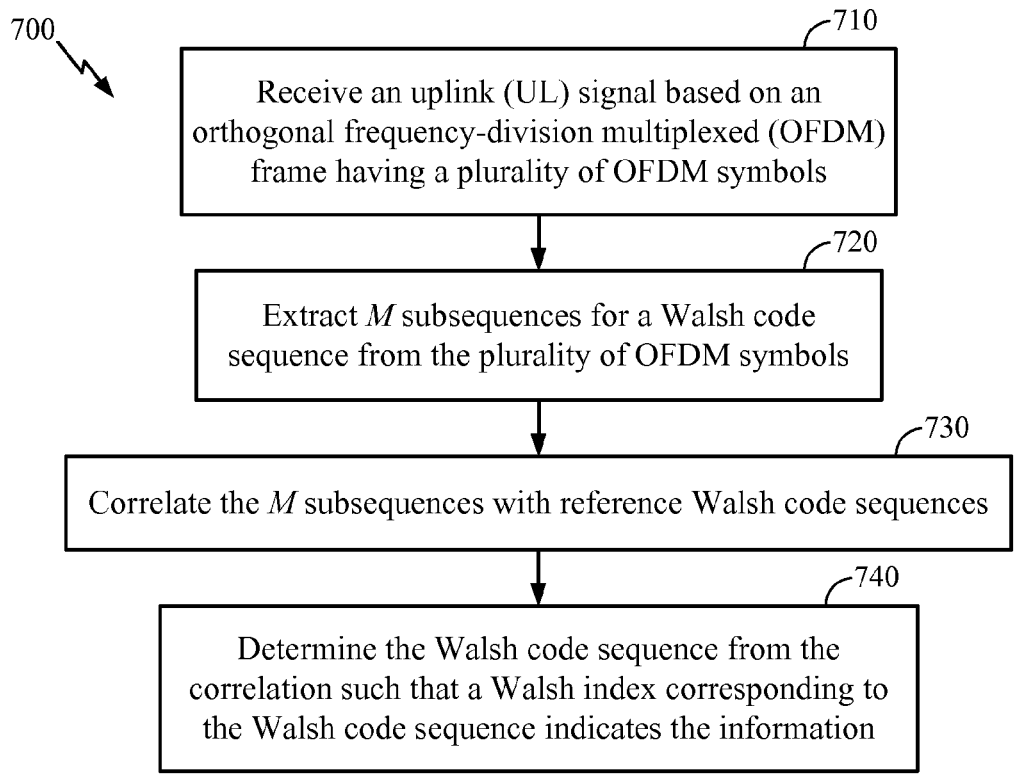
FIG. 7 is a flow diagram of example operations for interpreting information sent using CDMA in a wireless communications system from the perspective of an access point (AP), in accordance with certain embodiments of the present disclosure.
Figure 7A:
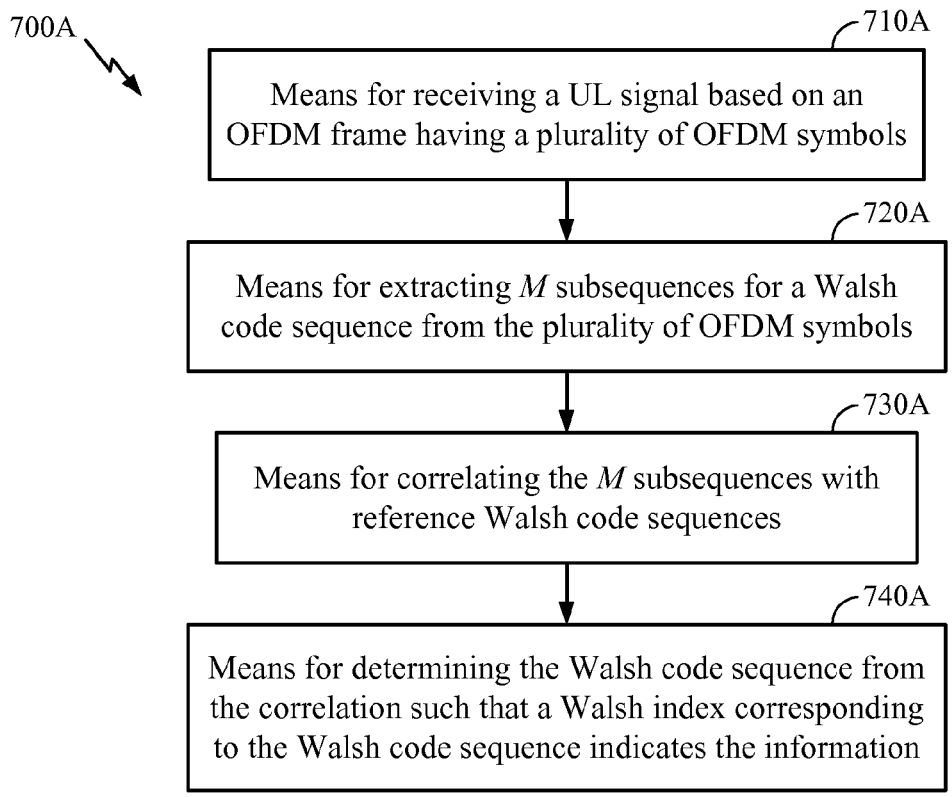
FIG. 7A is a block diagram of means corresponding to the example operations of FIG. 7 for interpreting information sent using CDMA in a wireless communications system from the perspective of an AP, in accordance with certain embodiments of the present disclosure.

Once the tones have been transmitted by the user terminal as an OFDM transmission, an AP may try to interpret information in the received UL signal. FIG. 7 is a flow diagram of example operations 700, from the perspective of the AP, for interpreting information sent using CDMA in a wireless communications system. The operations 700 may begin, at 710, by receiving an uplink signal based on an OFDM frame having a plurality of OFDM symbols.

At 720, the AP may extract M subsequences for a Walsh code sequence from the plurality of OFDM symbols. The AP may correlate the M subsequences with reference Walsh code sequences at 730. At 740, the AP may determine the Walsh code sequence form the correlation such that a Walsh index corresponding to the Walsh code sequence indicates conveyed information. For certain embodiments, if the conveyed information was a resource request (REQ), the AP may transmit an acknowledgment of the REQ for reception by the user terminal. For other embodiments, if the conveyed information was a CQI, the AP may transmit a downlink (DL) signal based on the CQI.

For some embodiments, the AP may determine the Walsh code sequence by comparing a threshold to correlation metrics and considering reference Walsh code sequences corresponding to the metrics above the threshold as the received Walsh code sequence(s). This method is described in greater detail below.

Figure 8:
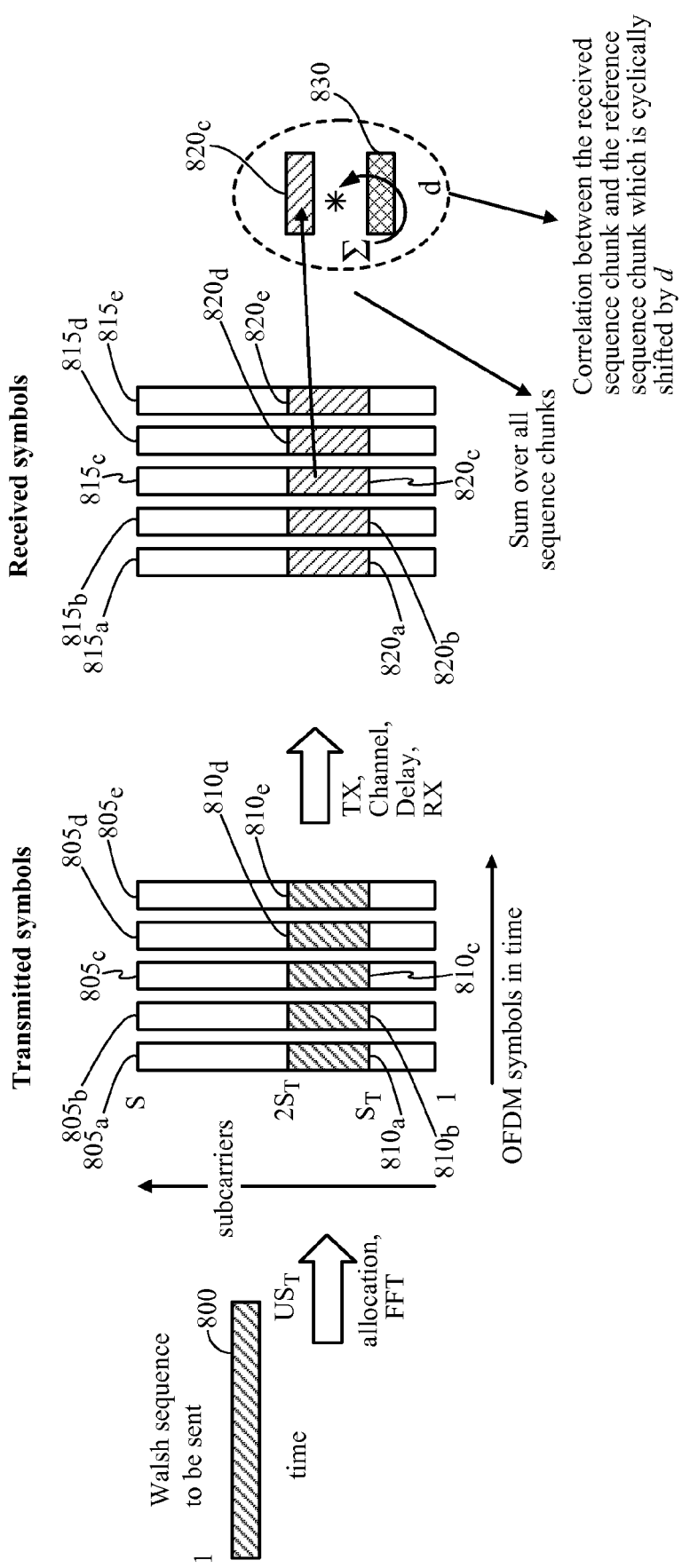
FIG. 8 illustrates sending and receiving a Walsh code sequence via OFDM, in accordance with certain embodiments of the present disclosure.

FIG. 8 illustrates sending and receiving a Walsh sequence 800 via OFDM. The Walsh sequence 800 may be divided into subsequences and converted into tones (i.e., OFDM subcarriers) as described above, where each converted subsequence 810 is on a different OFDM symbol 805. After the user terminal transmits the OFDM symbols 805 in an OFDM frame via the wireless channel, the AP may receive the OFDM symbols 815 after a certain delay.

At the AP, each subsequence 820 may be extracted from the received OFDM symbol 815. A correlation between each subsequence 820 and a reference Walsh code subsequence 830 may be performed. Furthermore, the reference Walsh code subsequence 830 may be cyclically shifted by a delay d, and a correlation between each subsequence 820 and the cyclically shifted reference Walsh code subsequence may be determined for all shifted sequences or up to a predetermined number of cyclical shifts. The final correlation metric may be the sum of all correlations performed on the subsequences 820 for a given reference Walsh code sequence used (and all receiving antennas) at a particular shift.

Figure 9:
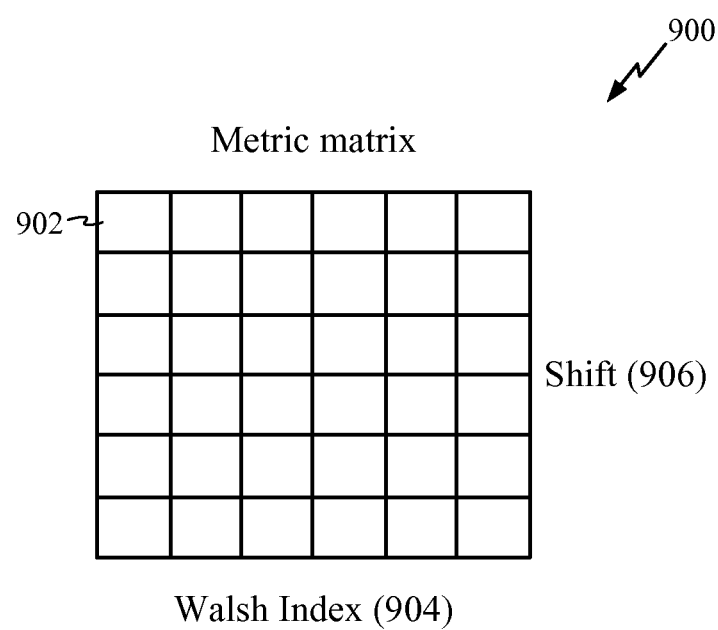
FIG. 9 illustrates a metric matrix, in accordance with certain embodiments of the present disclosure.

FIG. 9 illustrates an example metric matrix 900 having a plurality of cells 902. The metric matrix 900 may be arranged according to the reference Walsh code sequence used (or more practically to the reference sequence's corresponding Walsh index 904 as shown) and to the cyclical shift 906 of that reference sequence, in integer multiples of delay d. For some embodiments, the metric calculation for each cell 902 may be:

$$M_{w,d} = \frac{\sum_{a=1}^{Nr} |c_{w,d,a}|^2}{\frac{(PN)^2}{2}}$$

where M is the final metric, w is the Walsh index of the reference Walsh code sequence used, d is the shift index, a is the antenna receiving the data, Nr is the number of receiving antennas, P is the power of the received signal, and N is the normalization of the reference sequence. The correlation c for each antenna a, Walsh index w, and shift index d may be calculated as $$c_{w,d,a} = \sum_{u=1}^{U} s_{w,d}^u \cdot r_a^{u*}$$

where u is the OFDM symbol, U is the number of OFDM symbols, s is the shifted reference sequence, and r is the received sequence. The power P of the received signal may be calculated as $$P = \sqrt{\sum_{a,u=1}^{Nr,U} r_a^u \cdot r_a^{u*}}$$

Correlating M subsequences with reference N-bit code sequences to calculate the correlation metrics for each cell 902 may include: (a) selecting one of the reference N-bit code sequences; (b) dividing the selected reference N-bit code sequence into M reference subsequences; (c) cyclically shifting each of the M reference subsequences by an integer multiple of delay d; (d) calculating a correlation value of each of the M subsequences with the shifted M reference subsequences; (e) summing the correlation values from (d) to determine a metric for the selected reference N-bit code sequence at the current integer multiple of delay d; (f) cyclically shifting each of the M reference subsequences by a different integer multiple of delay d; (g) repeating steps (d)-(f) until a plurality of metrics for the selected reference N-bit code sequence has been determined for a predetermined number of cyclical shifts; (h) selecting a different one of the reference N-bit code sequences; and (i) repeating steps (b)-(h) until metrics have been determined for all of the reference N-bit code sequences and the predetermined number of cyclical shifts.

Figure 10:
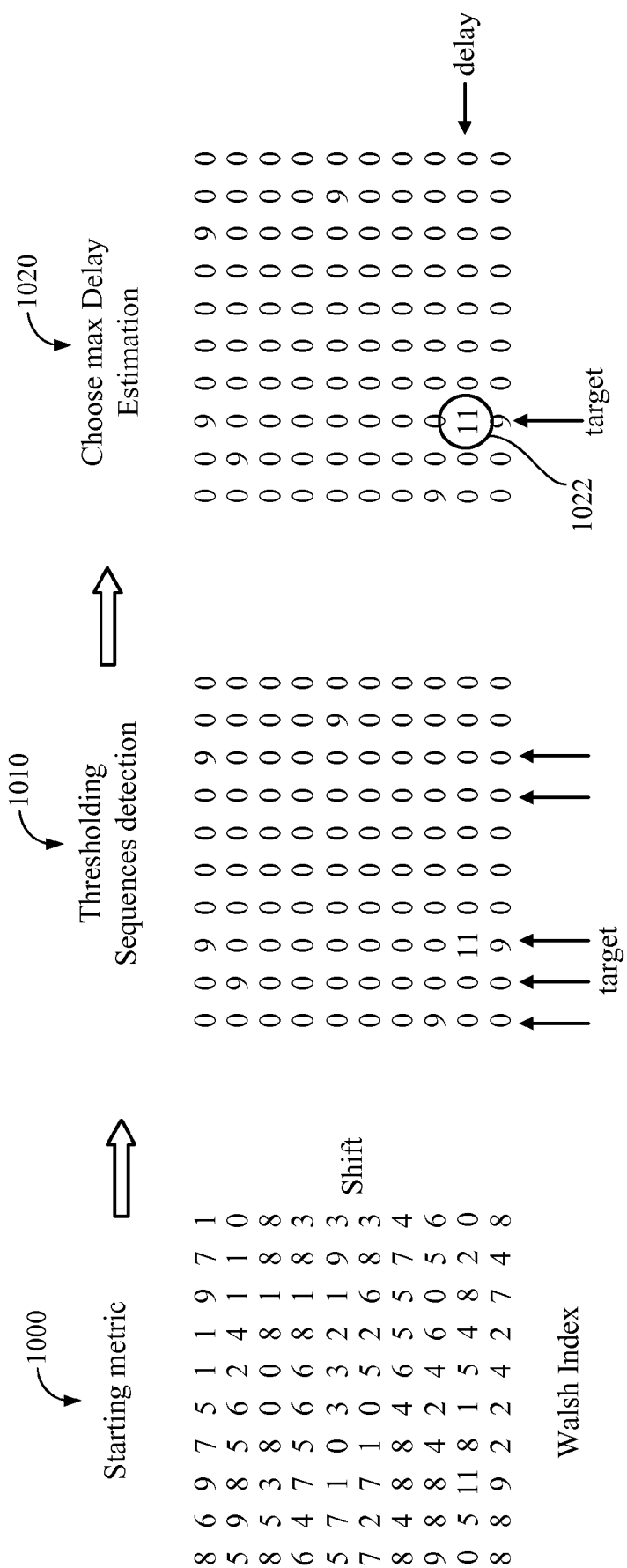
FIG. 10 illustrates calculating a metric matrix, thresholding the matrix, and determining the delay between a user terminal and an AP in a wireless communications system based on the threshold matrix, in accordance with certain embodiments of the present disclosure.

FIG. 10 illustrates a portion of an example metric matrix 1000 once the metric calculations have been performed for the cells 902 of the metric matrix 900. The metric matrix 1000 may be thresholded to yield a thresholded metric matrix 1010. Thresholding may be used to remove the effects of noise, interference, and/or frequency offset. In the thresholded metric matrix 1010, all metric values below a certain threshold have been replaced with zeros. Starting with the example metric matrix 1000, all metric values below a 9 were replaced with zeros, leaving only five columns with remaining metric values greater than or equal to 9 in the thresholded metric matrix 1010. The columns with metric values greater than or equal to the threshold may be considered as candidate Walsh indices corresponding to information contained in the message. As described above, this information may include a resource request (REQ) or a CQI, for example. In the thresholded matrix 1010, the five columns with metric values greater than or equal to 9 may indicate five different Walsh indices.

The CDMA-based scheme described above may offer a number of advantages when compared to conventional techniques for transmitting UL signals from a large number of user terminals. First, efficiency with respect to the number of slots used may be increased. In addition, this scheme may be scalable to a high number of user terminals and may have a soft limit as to the number of users that can be supported.

Furthermore, this CDMA-based scheme may offer greater tolerance to frequency offsets.

The choice of a CDMA sequence of length N=512 seems to be a good tradeoff between detection performance and amount of information sent. A reliable detection and ranging of up 25 user terminals per 5 MHz band is possible. With the current scheme, up to ±64 chips of delay may be detected. Performance may suffer as the delay to be detected increases.

False alarm probability highly depends on the frequency offset, at high signal-to-interference-plus-noise ratio (SINR). Frequency offset may add a deterministic modulation to the sent symbols in the time domain. This deterministic component may change the cross correlation properties of the received sequences. In other words, sequences that were originally orthogonal to each other may no longer be orthogonal after transmission due to frequency offset, thereby leading to increased false detection. In the presence of high noise levels, the detection threshold may be increased in an effort to prevent false detection of non-null cross-correlations arising from frequency offset.

Interleaving may also be used to reduce the false alarm probability in the presence of frequency offset. Therefore, for some embodiments, the user terminal may interleave the Walsh sequence as illustrated in the interleaving block 608 of FIG. 6. Interleaving may help to eliminate cross-correlations due to frequency offset, thereby reducing the false alarm probability without affecting the detection probability. However, interleaving may entail increased memory requirements since all the OFDM symbols have to be received before the sequence can be de-interleaved. Furthermore, de-interleaving may require more processing time after the last OFDM symbol is received.

Ranging Using CDMA

In future WLAN systems, uplink SDMA may rely heavily on the time synchronization of the user terminal signals arriving at the AP. Another advantage offered by the CDMA-based scheme described above is the ability to perform ranging at an AP and get timing information of a large number of user terminals in a very short duration.

Figure 11:
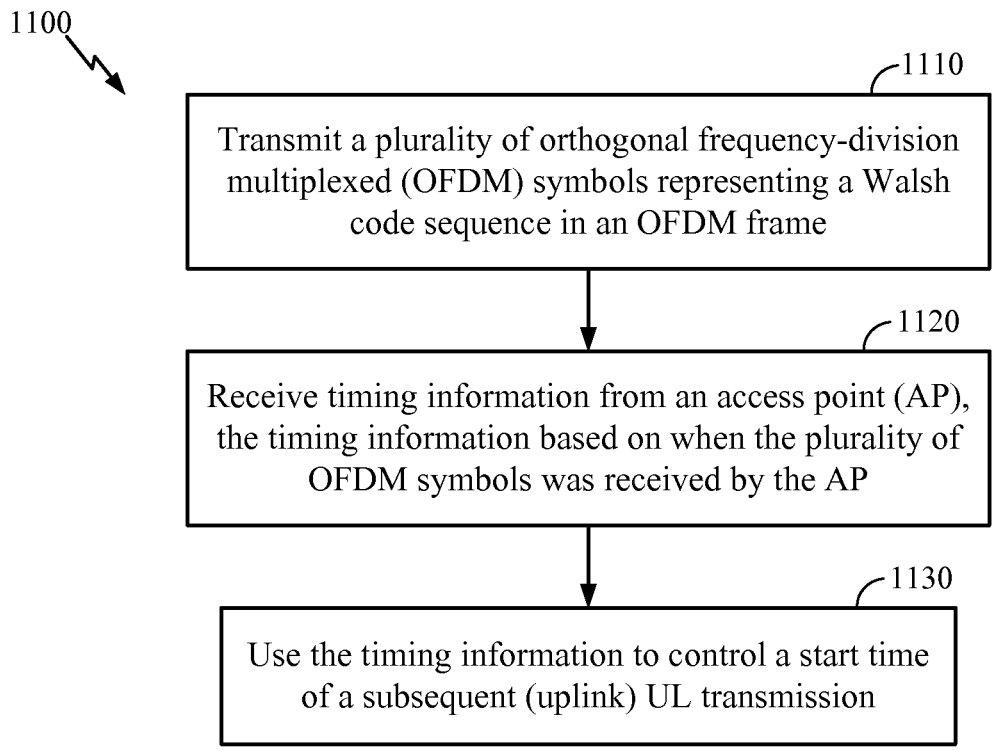
FIG. 11 is a flow diagram of example operations for ranging in a wireless communications system based on sending information using CDMA from the perspective of a user terminal, in accordance with certain embodiments of the present disclosure.
Figure 11A:
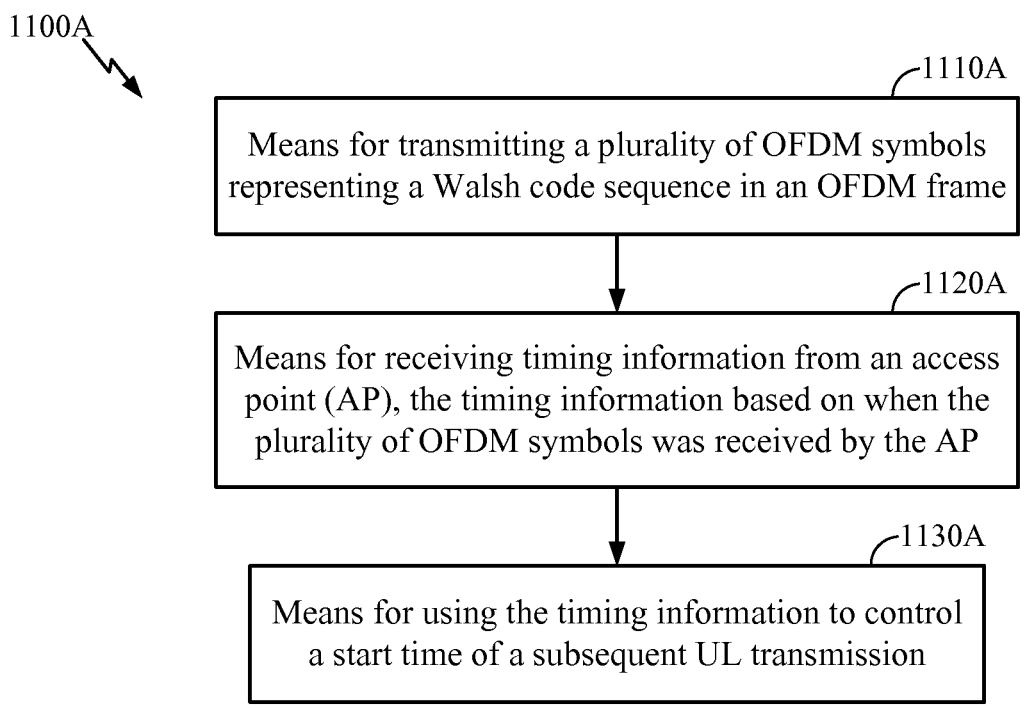
FIG. 11A is a block diagram of means corresponding to the example operations of FIG. 11 for ranging in a wireless communications system based on sending information using CDMA from the perspective of a user terminal, in accordance with certain embodiments of the present disclosure.

FIG. 11 is a flow diagram of example operations 1100, from the perspective of a user terminal, for ranging in a wireless communications system based on sending information using CDMA. The operations 1100 may begin, at 1110, by transmitting a plurality of OFDM symbols representing a Walsh code sequence in an OFDM frame, as described above. As described above, the plurality of OFDM symbols may be transmitted (as a UL signal) from a user terminal 120 to an AP 110 (in an infrastructure mode of deployment) or from one STA to one or more other STAs (in a peer-to-peer application mode or ad hoc deployment). In other words, ranging may be performed between an AP 110 and a user terminal 120 or between a first user terminal and a second user terminal. The operations 1100 below focus on embodiments where ranging is performed between an AP 110 and a user terminal 120, although the reader will understand that the AP 110 may be replaced by a second user terminal (e.g., a STA) in other embodiments.

At 1120, the user terminal may receive timing information from the AP. This timing information may be based on when the plurality of OFDM symbols was received by the AP. The timing information may include a propagation delay (or delay information based on said propagation delay) between the user terminal and the AP. At 1130, the user terminal may use the timing information to control a start time of a subsequent UL transmission. In this manner, with multiple user terminals transmitting information according to their respective timing information based on different delays between the user terminals and the AP, the information from the multiple user terminals may be received at the AP simultaneously.

Again, although embodiments of the present disclosure refer to Walsh sequences and indices, any suitable N-bit code sequence and corresponding indices may be used. For example, certain embodiments may derive the N-bit code sequence from an IEEE 802.11b waveform. As another example, certain embodiments may use a Barker sequence or a modified Barker sequence.

Figure 12:
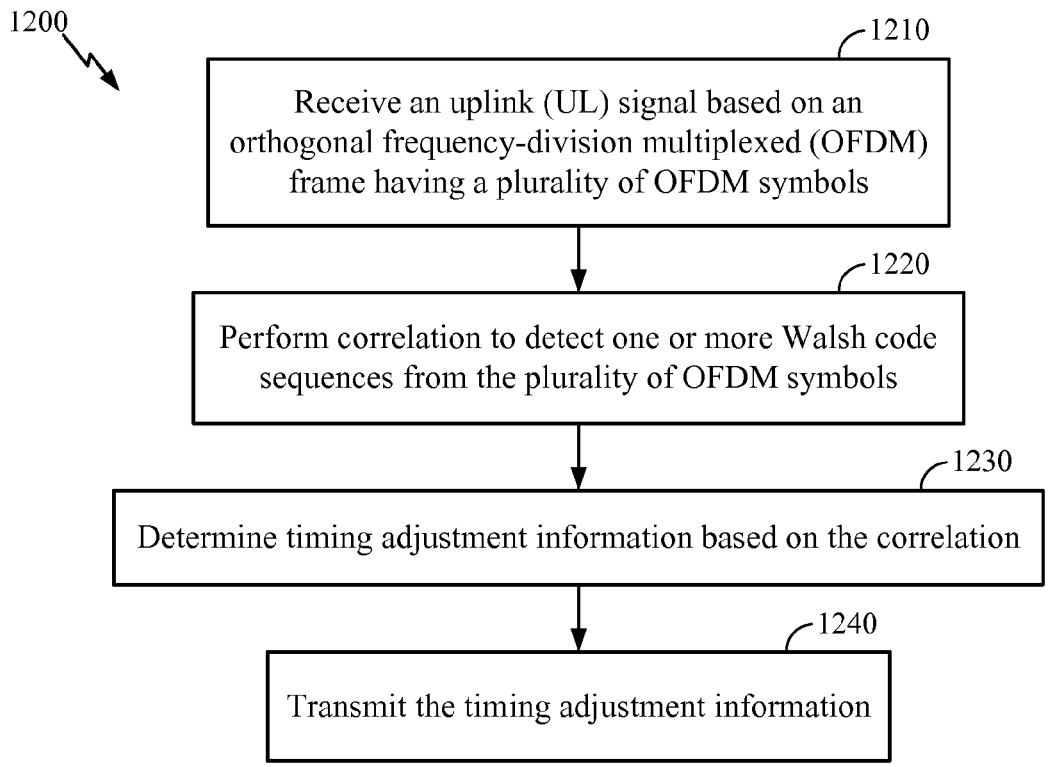
FIG. 12 is a flow diagram of example operations for ranging in a wireless communications system based on information sent using CDMA from the perspective of an AP, in accordance with certain embodiments of the present disclosure.

FIG. 12 is a flow diagram of example operations 1200, from the perspective of an AP, for ranging in a wireless communications system based on information sent using CDMA. The operations 1200 may begin, at 1210, by receiving an uplink signal based on an OFDM frame having a plurality of OFDM symbols. At 1220, the AP may perform correlation to detect one or more Walsh code sequences from the plurality of OFDM symbols, as described above.

At 1230, the AP may determine timing adjustment information based on the correlation, which is described in greater detail below. At 1240, the AP may transmit the timing adjustment information to the AP. The operations 1200 may be performed for multiple user terminals, each having different timing adjustment information.

Referring back to FIG. 10, the thresholded metric matrix 1010 may determine which Walsh indices were likely included in the transmitted message, as described above. The cell 1022 with the highest metric may be selected as the cell representing the most accurate estimate of the propagation delay between the user terminal and the AP as shown in matrix 1020. The delay d of the shift index corresponding to the cell 1022 may represent the propagation delay. This delay d may be used to calculate the timing adjustment information, which may be transmitted by the AP to the user terminal.

Figure 13:
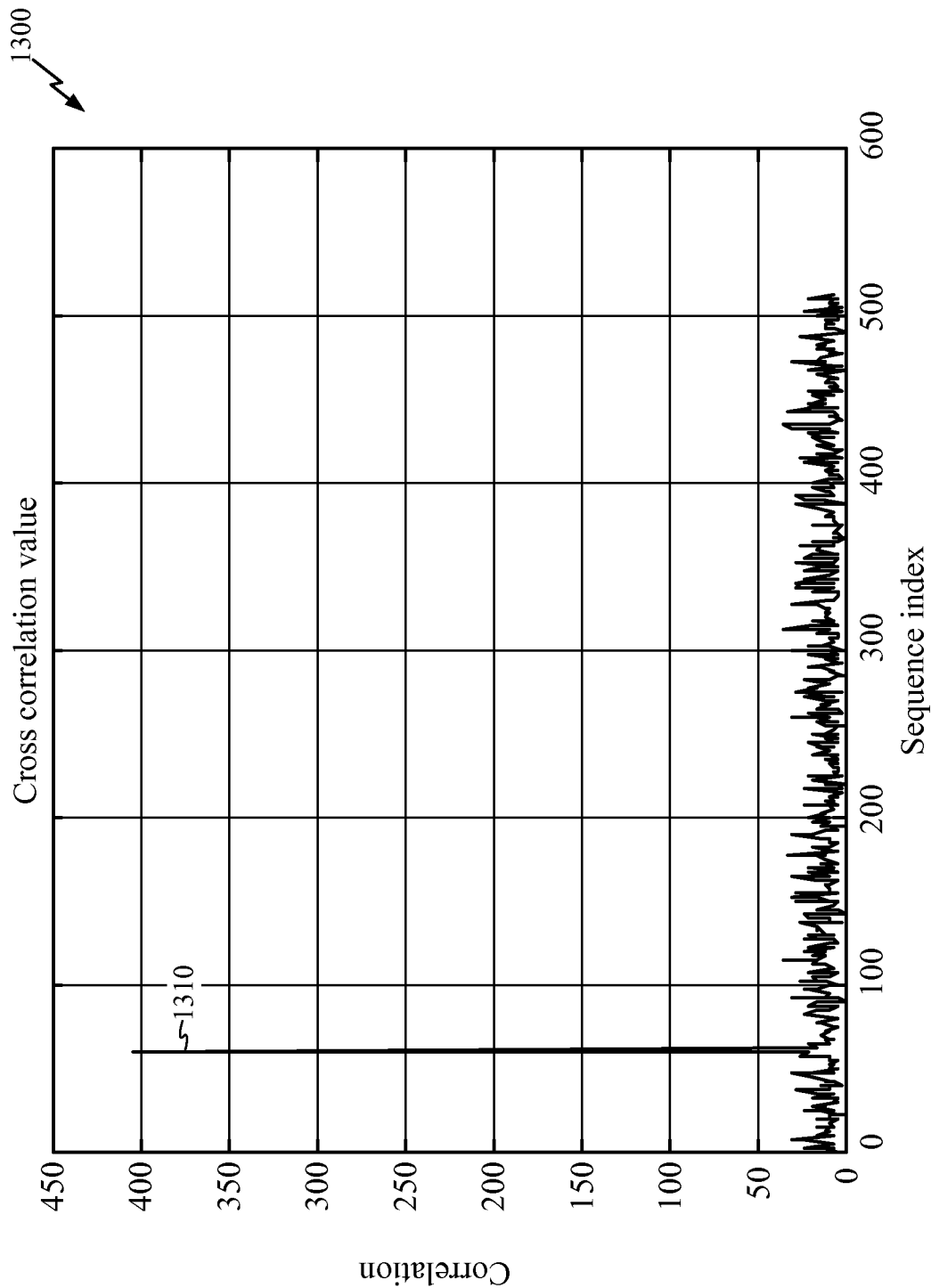
FIG. 13 illustrates a graph of correlation metrics at different Walsh indices with a peak indicative of the delay between a user terminal and an AP, in accordance with certain embodiments of the present disclosure.

FIG. 13 illustrates a graph 1300 of correlation metrics at 512 different Walsh indices after thresholding an example metric matrix and selecting one shift index to represent the propagation delay between the AP and a particular user terminal, from which the timing adjustment information intended for that user terminal may be calculated. Moreover, the peak 1310 may indicate that a Walsh code is present, and the Walsh index corresponding to the peak 1310 may represent the received information.

Figure 4A:
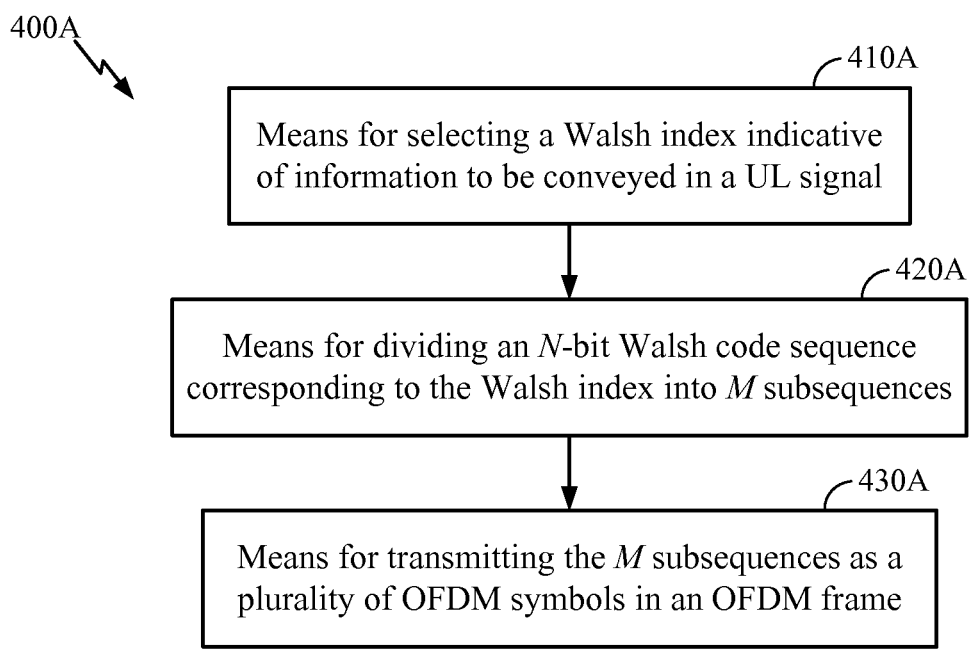
FIG. 4A is a block diagram of means corresponding to the example operations of FIG. 4 for conveying information in a wireless communications system using CDMA from the perspective of a user terminal, in accordance with certain embodiments of the present disclosure.
Figure 12A:
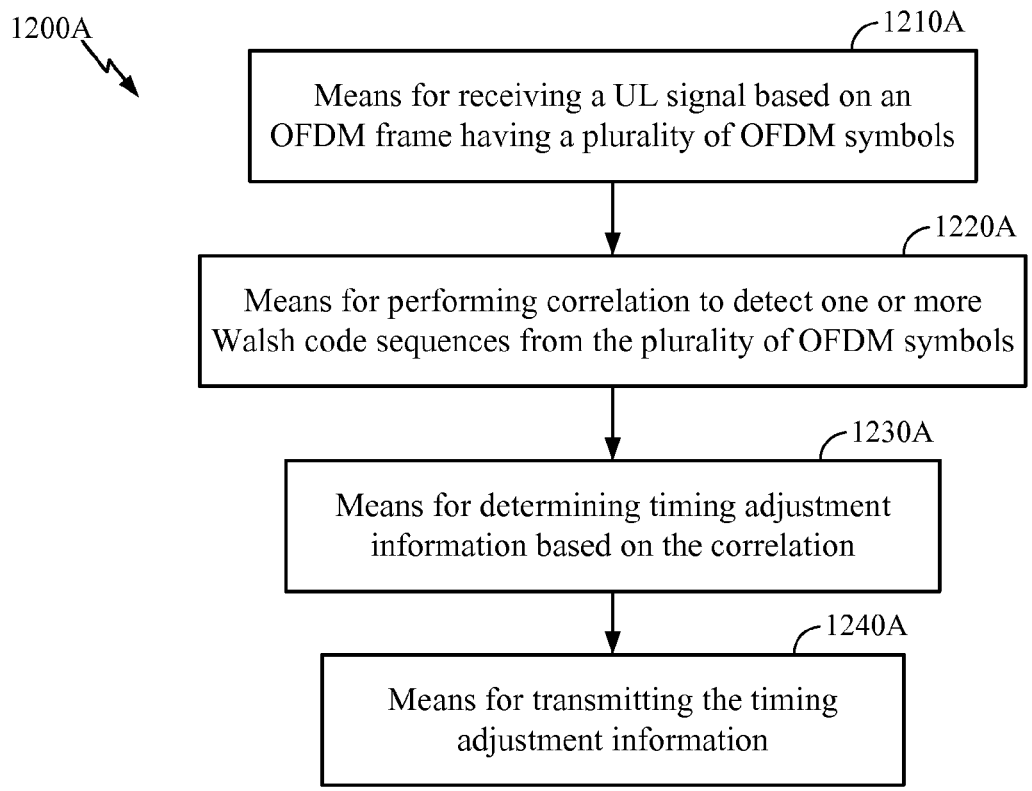
FIG. 12A is a block diagram of means corresponding to the example operations of FIG. 12 for ranging in a wireless communications system based on information sent using CDMA from the perspective of an AP, in accordance with certain embodiments of the present disclosure.

The various operations of methods described above may be performed by various hardware and/or software component (s) and/or module(s) corresponding to means-plus-function blocks illustrated in the figures. Generally, where there are methods illustrated in figures having corresponding counterpart means-plus-function figures, the operation blocks correspond to means-plus-function blocks with similar numbering. For example, blocks 410-430 illustrated in FIG. 4 correspond to means-plus-function blocks 410A-430A illustrated in FIG. 4A, and blocks 1210-1240 illustrated in FIG. 12 correspond to means-plus-function blocks 1210A-1240A illustrated in FIG. 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for acquiring timing information in a wireless communications system, comprising:
    selecting an index indicative of information to be conveyed in a uplink (UL) signal;
    dividing a code sequence corresponding to the index into subsequences, wherein the code sequence comprises a Walsh sequence;
    transmitting the subsequences as a plurality of orthogonal frequency-division multiplexed (OFDM) symbols in an OFDM frame;
    receiving timing information from an access point (AP) or a user terminal, the timing information based on when the plurality of OFDM symbols was received by the AP or the user terminal; and
    using the timing information to control a start time of a subsequent uplink (UL) transmission.

2. The method of claim 1, wherein the code sequence is derived from an IEEE 802.11b Barker sequence.

3. The method of claim 1, wherein the code sequence comprises a code-division multiple access (CDMA) sequence.

4. The method of claim 1, wherein the wireless communications system comprises a Wireless Local Area Network (WLAN) system according to an IEEE 802.11 family of standards.

5. The method of claim 1, further comprising quadrature phase-shift keying (QPSK) scrambling the code sequence corresponding to the index to indicate one of a plurality of user terminals simultaneously transmitting UL signals, wherein dividing the code sequence comprises dividing the QPSK-scrambled code sequence into the subsequences.

6. The method of claim 1, wherein the information comprises at least one of a resource request, a channel quality indicator (CQI), a known pilot sequence, a beamforming metric, and other metric variants pertaining to channel quality.

7. The method of claim 1, wherein the code sequence comprises a 1024-bit code sequence and dividing the code sequence comprises dividing the 1024-bit code sequence into 64 subsequences, each subsequence having 16 samples.

8. The method of claim 7, wherein transmitting the 64 subsequences comprises transmission spanning 64 OFDM symbols, wherein 16 subcarriers are used in each of the OFDM symbols.

9. The method of claim 1, wherein using the timing information comprises delaying the start time of the subsequent UL transmission according to the timing information.

10. The method of claim 1, wherein the UL transmission comprises one or more signals transmitted from the device to the user terminal in a peer-to-peer application mode or from the device to the AP.

11. A computer-program product for acquiring timing information in a wireless communications system, comprising a non-transitory computer-readable medium having instructions stored thereon, the instructions being executable by one or more processors and the instructions comprising:
   instructions for selecting an index indicative of information to be conveyed in a UL signal;
   instructions for dividing the code sequence corresponding to the index into subsequences, wherein the code sequence comprises a Walsh sequence;
   instructions for transmitting the subsequences as a plurality of orthogonal frequency-division multiplexed (OFDM) symbols in an OFDM frame;
   instructions for receiving timing information from an access point (AP) or a user terminal, the timing information based on when the plurality of OFDM symbols was received by the AP or the user terminal; and
   instructions for using the timing information to control a start time of a subsequent uplink (UL) transmission.

12. The computer-program product of claim 11, wherein the code sequence is derived from an IEEE 802.11b Barker sequence.

13. The computer-program product of claim 11, wherein the code sequence comprises a code-division multiple access (CDMA) sequence.

14. The computer-program product of claim 11, wherein the wireless communications system comprises a Wireless Local Area Network (WLAN) system according to an IEEE 802.11 family of standards.

15. The computer-program product of claim 11, further comprising instructions for quadrature phase-shift keying (QPSK) scrambling the code sequence corresponding to the index to indicate one of a plurality of user terminals simultaneously transmitting UL signals, wherein the instructions for dividing the code sequence comprise instructions for dividing the QPSK-scrambled code sequence into the subsequences.

16. The computer-program product of claim 11, wherein the information comprises at least one of a resource request, a channel quality indicator (CQI), a known pilot sequence, a beamforming metric, and other metric variants pertaining to channel quality.

17. The computer-program product of claim 11, wherein the code sequence comprises a 1024-bit code sequence and the instructions for dividing the code sequence comprise instructions for dividing the 1024-bit code sequence into 64 subsequences, each subsequence having 16 samples.

18. The computer-program product of claim 17, wherein the instructions for transmitting the 64 subsequences comprise instructions for transmission spanning 64 OFDM symbols, wherein 16 subcarriers are used in each of the OFDM symbols.

19. The computer-program product of claim 11, wherein the instructions for using the timing information comprise instructions for delaying the start time of the subsequent UL transmission according to the timing information.

20. The computer-program product of claim 11, wherein the UL transmission comprises one or more signals transmitted from the device to the user terminal in a peer-to-peer application mode or from the device to the AP.

21. An apparatus for wireless communications, comprising:
   means for selecting an index indicative of information to be conveyed in a UL signal;
   means for dividing the code sequence corresponding to the index into subsequences, wherein the code sequence comprises a Walsh sequence;
   means for transmitting the subsequences as a plurality of orthogonal frequency-division multiplexed (OFDM) symbols in an OFDM frame;
   means for receiving timing information from an access point (AP) or a user terminal, the timing information based on when the plurality of OFDM symbols was received by the AP or the user terminal; and
   means for using the timing information to control a start time of a subsequent uplink (UL) transmission.

22. The apparatus of claim 21, wherein the code sequence is derived from an IEEE 802.11b Barker sequence.

23. The apparatus of claim 21, wherein the code sequence comprises a code-division multiple access (CDMA) sequence.

24. The apparatus of claim 21, wherein the apparatus is part of a Wireless Local Area Network (WLAN) system according to an IEEE 802.11 family of standards.

25. The apparatus of claim 21, further comprising means for quadrature phase-shift keying (QPSK) scrambling the code sequence corresponding to the index to indicate one of a plurality of user terminals simultaneously transmitting UL signals, wherein the means for dividing the code sequence is configured to divide the QPSK-scrambled code sequence into the subsequences.

26. The apparatus of claim 21, wherein the information comprises at least one of a resource request, a channel quality indicator (CQI), a known pilot sequence, a beamforming metric, and other metric variants pertaining to channel quality.

27. The apparatus of claim 21, wherein the code sequence comprises a 1024-bit code sequence and the means for dividing the code sequence are configured to divide the 1024-bit code sequence into 64 subsequences, each subsequence having 16 samples.

28. The apparatus of claim 27, wherein the means for transmitting the 64 subsequences is configured to transmission span 64 OFDM symbols, wherein 16 subcarriers are used in each of the OFDM symbols.

29. The apparatus of claim 21, wherein the means for using the timing information is configured to delay the start time of the subsequent UL transmission according to the timing information.

30. The apparatus of claim 21, wherein the UL transmission comprises one or more signals transmitted from the apparatus to the user terminal in a peer-to-peer application mode or from the apparatus to the AP.

31. A mobile device, comprising:
   logic for selecting an index indicative of information to be conveyed in a UL signal;
   logic for dividing the code sequence corresponding to the index into subsequences, wherein the code sequence comprises a Walsh sequence;
   a transmitter configured to transmit the subsequences as a plurality of orthogonal frequency-division multiplexed (OFDM) symbols in an OFDM frame;

a receiver configured to receive timing information from an access point (AP) or another mobile device, the timing information based on when the plurality of OFDM symbols was received by the AP or the other mobile device; and logic for using the timing information to control a start time of a subsequent uplink (UL) transmission.

32. The mobile device of claim 31, wherein the code sequence is derived from an IEEE 802.11b Barker sequence.

33. The mobile device of claim 31, wherein the code sequence comprises a code-division multiple access (CDMA) sequence.

34. The mobile device of claim 31, wherein the mobile device is part of a Wireless Local Area Network (WLAN) system according to an IEEE 802.11 family of standards.

35. The mobile device of claim 31, further comprising logic for quadrature phase-shift keying (QPSK) scrambling the code sequence corresponding to the index to indicate one of a plurality of user terminals simultaneously transmitting UL signals, wherein the logic for dividing the code sequence is configured to divide the QPSK-scrambled code sequence into the subsequences.

36. The mobile device of claim 31, wherein the information comprises at least one of a resource request, a channel quality indicator (CQI), a known pilot sequence, a beamforming metric, and other metric variants pertaining to channel quality.

37. The mobile device of claim 31, wherein the code sequence comprises a 1024-bit code sequence and the logic for dividing the code sequence is configured to divide the 1024-bit code sequence into 64 subsequences, each subsequence having 16 samples.

38. The mobile device of claim 37, wherein the transmitter is configured to transmission span 64 OFDM symbols, wherein 16 subcarriers are used in each of the OFDM symbols.

39. The mobile device of claim 31, wherein the logic for using the timing information is configured to delay the start time of the subsequent UL transmission according to the timing information.

40. The mobile device of claim 31, wherein the UL transmission comprises one or more signals transmitted from the mobile device to the other mobile device in a peer-to-peer application mode or from the mobile device to the AP.

41. A method for determining timing information in a wireless communications system, comprising:
receiving an uplink (UL) signal based on an orthogonal frequency-division multiplexed (OFDM) frame having a plurality of OFDM symbols;
extracting code subsequences from the plurality of OFDM symbols;
correlating the subsequences with reference code sequences;
determining one or more code sequences from the correlation, wherein the one or more code sequences comprise a Walsh sequence;
determining timing adjustment information based on the correlation and when the plurality of the OFDM symbols was received; and
transmitting the timing adjustment information.

42. The method of claim 41, wherein the one or more code sequences are derived from an IEEE 802.11b Barker sequence.

43. The method of claim 41, wherein the one or more code sequences comprise a code-division multiple access (CDMA) sequence.

44. The method of claim 41, wherein determining the timing adjustment information comprises selecting a delay corresponding to the highest correlation value from the correlation.

45. The method of claim 41, wherein correlating the subsequences with the reference code sequences comprises calculating metrics, one for each of the reference code sequences, by summing correlation values between each of the subsequences and a corresponding reference code sequence.

46. The method of claim 45, wherein determining the one or more code sequences comprises:
comparing a threshold to the metrics; and
considering, as received code sequences, the reference code sequences corresponding to the metrics above the threshold.

47. The method of claim 41, wherein correlating the subsequences with the reference code sequences comprises:
(a) selecting one of the reference code sequences;
(b) dividing the selected reference code sequence into reference subsequences;
(c) cyclically shifting each of the reference subsequences by an integer multiple of delay d;
(d) calculating a correlation value of each of the subsequences with the shifted reference subsequences;
(e) summing the correlation values from (d) to determine a metric for the selected reference code sequence at the current integer multiple of the delay d;
(f) cyclically shifting each of the reference subsequences by a different integer multiple of delay d;
(g) repeating steps (d)-(f) until metrics for the selected reference code sequence have been determined for a predetermined number of cyclical shifts;
(h) selecting a different one of the reference code sequences; and
(i) repeating steps (b)-(h) until the metrics have been determined for all of the reference code sequences and the predetermined number of cyclical shifts.

48. The method of claim 47, wherein determining the one or more code sequences comprises:
comparing a threshold to the metrics; and
considering, as received code sequences, the reference code sequences corresponding to the metrics above the threshold.

49. The method of claim 47, wherein determining the timing adjustment information comprises:
selecting one of the cyclically shifted reference code sequences with the highest metric out of the metrics;
determining the integer multiple of the delay d used for the selected cyclically shifted reference code sequence; and
calculating the timing adjustment information based on the integer multiple of the delay d used.

50. The method of claim 41, wherein an index corresponding to at least one of the code sequences indicates UL information.

51. The method of claim 50, wherein the UL information comprises at least one of a resource request (REQ), a channel quality indicator (CQI), a known pilot sequence, a beamforming metric, and other metric variants pertaining to channel quality.

52. A computer-program product for determining timing information in a wireless communications system, comprising a non-transitory computer-readable medium having instructions stored thereon, the instructions being executable by one or more processors and the instructions comprising:

instructions for receiving an uplink (UL) signal based on an orthogonal frequency-division multiplexed (OFDM) frame having a plurality of OFDM symbols;
instructions for extracting code subsequences from the plurality of OFDM symbols;
instructions for correlating the subsequences with reference code sequences;
instructions for determining the one or more code sequences from the correlation, wherein the one or more code sequences comprise a Walsh sequence;
instructions for determining timing adjustment information based on the correlation and when the plurality of the OFDM symbols was received; and
instructions for transmitting the timing adjustment information.

53. The computer-program product of claim 52, wherein the one or more code sequences are derived from an IEEE 802.11b Barker sequence.

54. The computer-program product of claim 52, wherein the one or more code sequences comprise a code-division multiple access (CDMA) sequence.

55. The computer-program product of claim 52, wherein the instructions for determining the timing adjustment information comprise instructions for selecting a delay corresponding to the highest correlation value from the correlation.

56. The computer-program product of claim 52, wherein the instructions for correlating the subsequences with the reference code sequences comprise instructions for calculating metrics, one for each of the reference code sequences, by summing correlation values between each of the subsequences and a corresponding reference code sequence.

57. The computer-program product of claim 56, wherein the instructions for determining the one or more code sequences comprise:
instructions for comparing a threshold to the metrics; and
instructions for considering, as received code sequences, the reference code sequences corresponding to the metrics above the threshold.

58. The computer-program product of claim 52, wherein the instructions for performing the correlation comprise:
(a) instructions for selecting one of the reference code sequences;
(b) instructions for dividing the selected reference code sequence into reference subsequences;
(c) instructions for cyclically shifting each of the reference subsequences by an integer multiple of delay d;
(d) instructions for calculating a correlation value of each of the subsequences with the shifted reference subsequences;
(e) instructions for summing the correlation values from (d) to determine a metric for the selected reference code sequence at the current integer multiple of the delay d;
(f) instructions for cyclically shifting each of the reference subsequences by a different integer multiple of delay d;
(g) instructions for repeating steps (d)-(f) until metrics for the selected reference code sequence have been determined for a predetermined number of cyclical shifts;
(h) instructions for selecting a different one of the reference code sequences; and
(i) instructions for repeating steps (b)-(h) until the metrics have been determined for all of the reference code sequences and the predetermined number of cyclical shifts.

59. The computer-program product of claim 58, wherein the instructions for determining the one or more code sequences comprise:
instructions for comparing a threshold to the metrics; and
instructions for considering, as received code sequences, the reference code sequences corresponding to the metrics above the threshold.

60. The computer-program product of claim 58, wherein the instructions for determining the timing adjustment information comprise:
instructions for selecting one of the cyclically shifted reference code sequences with the highest metric out of the metrics;
instructions for determining the integer multiple of the delay d used for the selected cyclically shifted reference code sequence; and
instructions for calculating the timing adjustment information based on the integer multiple of the delay d used.

61. The computer-program product of claim 52, wherein an index corresponding to at least one of the code sequences indicates UL information.

62. The computer-program product of claim 61, wherein the UL information comprises at least one of a resource request (REQ), a channel quality indicator (CQI), a known pilot sequence, a beamforming metric, and other metric variants pertaining to channel quality.

63. An apparatus for wireless communications, comprising:
means for receiving an uplink (UL) signal based on an orthogonal frequency-division multiplexed (OFDM) frame having a plurality of OFDM symbols;
means for extract code subsequences from the plurality of OFDM symbols,
means for correlating the subsequences with reference code sequences;
means for determining the one or more code sequences from the correlation, wherein the one or more code sequences comprise a Walsh sequence;
means for determining timing adjustment information based on the correlation and when the plurality of the OFDM symbols was received; and
means for transmitting the timing adjustment information.

64. The apparatus of claim 63, wherein the one or more code sequences are derived from an IEEE 802.11b Barker sequence.

65. The apparatus of claim 63, wherein the one or more code sequences comprise a code-division multiple access (CDMA) sequence.

66. The apparatus of claim 63, wherein the means for determining the timing adjustment information is configured to select a delay corresponding to the highest correlation value from the correlation.

67. The apparatus of claim 63, wherein the means for performing the correlation is configured to correlate the subsequences with the reference code sequences by calculating metrics, one for each of the reference code sequences, by summing correlation values between each of the subsequences and a corresponding reference code sequence.

68. The apparatus of claim 67, wherein the means for performing the correlation is configured to determine the one or more code sequences by comparing a threshold to the metrics and considering, as received code sequences, the reference code sequences corresponding to the metrics above the threshold.

69. The apparatus of claim 63, wherein the means for performing the correlation is configured to:
(a) select one of the reference code sequences;
(b) divide the selected reference code sequence into reference subsequences;
(c) cyclically shift each of the reference subsequences by an integer multiple of a delay d;

(d) calculate a correlation value of each of the subsequences with the shifted reference subsequences;
(e) sum the correlation values from (d) to determine a metric for the selected reference code sequence at the current integer multiple of the delay d;
(f) cyclically shift each of the reference subsequences by a different integer multiple of the delay d;
(g) repeat steps (d)-(f) until metrics for the selected reference code sequence have been determined for a predetermined number of cyclical shifts;
(h) select a different one of the reference code sequences; and
(i) repeat steps (b)-(h) until the metrics have been determined for all of the reference code sequences and the predetermined number of cyclical shifts.

70. The apparatus of claim 69, wherein the means for performing the correlation is configured to determine the one or more code sequences by comparing a threshold to the metrics and considering, as received code sequences, the reference code sequences corresponding to the metrics above the threshold.

71. The apparatus of claim 69, wherein the means for determining the timing adjustment information is configured to select one of the cyclically shifted reference code sequences with the highest metric out of the metrics, determine the integer multiple of the delay d used for the selected cyclically shifted reference code sequence, and calculate the timing adjustment information based on the integer multiple of the delay d used.

72. The apparatus of claim 63, wherein an index corresponding to at least one of the code sequences indicates UL information.

73. The apparatus of claim 72, wherein the UL information comprises at least one of a resource request (REQ), a channel quality indicator (CQI), a known pilot sequence, a beamforming metric, and other metric variants pertaining to channel quality.

74. An access point (AP) for wireless communication, comprising:
a receiver configured to receive an uplink (UL) signal based on an orthogonal frequency-division multiplexed (OFDM) frame having a plurality of OFDM symbols;
logic for extracting code subsequences from the plurality of OFDM symbols,
logic for correlating the subsequences with reference code sequences, and
logic for determining the one or more code sequences from the correlation, wherein the one or more code sequences comprise a Walsh sequence;
logic for determining timing adjustment information based on the correlation when the plurality of the OFDM symbols was received by the AP; and
a transmitter configured to transmit the timing adjustment information.

75. The access point of claim 74, wherein the one or more code sequences are derived from an IEEE 802.11b Barker sequence.

76. The access point of claim 74, wherein the one or more code sequences comprise a code-division multiple access (CDMA) sequence.

77. The access point of claim 74, wherein the logic for determining the timing adjustment information is configured to select a delay corresponding to the highest correlation value from the correlation.

78. The access point of claim 74, wherein the logic for performing the correlation is configured to correlate the subsequences with the reference code sequences by calculating metrics, one for each of the reference code sequences, by summing correlation values between each of the subsequences and a corresponding reference code sequence.

79. The access point of claim 78, wherein the logic for performing the correlation is configured to determine the one or more code sequences by comparing a threshold to the metrics and considering, as received code sequences, the reference code sequences corresponding to the metrics above the threshold.

80. The access point of claim 74, wherein the logic for performing the correlation is configured to:
(a) select one of the reference code sequences;
(b) divide the selected reference code sequence into reference subsequences;
(c) cyclically shift each of the reference subsequences by an integer multiple of delay d;
(d) calculate a correlation value of each of the subsequences with the shifted reference subsequences;
(e) sum the correlation values from (d) to determine a metric for the selected reference code sequence at the current integer multiple of the delay d;
(f) cyclically shift each of the reference subsequences by a different integer multiple of delay d;
(g) repeat steps (d)-(f) until metrics for the selected reference code sequence have been determined for a predetermined number of cyclical shifts;
(h) select a different one of the reference code sequences; and
(i) repeat steps (b)-(h) until the metrics have been determined for all of the reference code sequences and the predetermined number of cyclical shifts.

81. The access point of claim 80, wherein the logic for performing the correlation is configured to determine the one or more code sequences by comparing a threshold to the metrics and considering, as received code sequences, the reference code sequences corresponding to the metrics above the threshold.

82. The access point of claim 80, wherein the logic for determining the timing adjustment information is configured to select one of the cyclically shifted reference code sequences with the highest metric out of the metrics, determine the integer multiple of the delay d used for the selected cyclically shifted reference code sequence, and calculate the timing adjustment information based on the integer multiple of the delay d used.

83. The access point of claim 74, wherein an index corresponding to at least one of the code sequences indicates UL information.

84. The access point of claim 83, wherein the UL information comprises at least one of a resource request (REQ), a channel quality indicator (CQI), a known pilot sequence, a beamforming metric, and other metric variants pertaining to channel quality.

85. A method for determining timing information in a wireless communications system, comprising:
selecting an index indicative of information to be conveyed in a UL signal;
dividing the code sequence corresponding to the index into subsequences, wherein the code sequence comprises a Walsh sequence;
transmitting the subsequences as a plurality of orthogonal frequency-division multiplexed (OFDM) symbols in an OFDM frame;
receiving timing information from an access point (AP), the timing information based on when the plurality of OFDM symbols was received by the AP; and using the timing information to control a start time of a subsequent uplink (UL) transmission such that one or more other UL transmissions from one or more other stations reach the AP at the same time as the subsequent UL transmission.

86. A wireless communications system, comprising:
a user terminal configured to select an index indicative of information to be conveyed in a UL signal, divide the code sequence corresponding to the index into subsequences, wherein the code sequence comprises a Walsh sequence, transmit the subsequences as a plurality of orthogonal frequency-division multiplexed (OFDM) symbols in an OFDM frame; and
an access point (AP) configured to receive the plurality of symbols in the OFDM frame, extract code subsequences from the plurality of OFDM symbols, correlate the subsequences with reference code sequences, determine the one or more code sequences from the correlation, determine timing information based on the correlation and when the plurality of OFDM symbols were received by the AP, and transmit the timing information such that the user terminal may use the timing information to control a start time of a subsequent uplink (UL) transmission.

87. The system of claim 86, wherein the code sequence is derived from an IEEE 802.11b Barker sequence.

88. The system of claim 86, wherein the code sequence comprises a code-division multiple access (CDMA) sequence.

89. The system of claim 86, wherein the wireless communications system comprises a Wireless Local Area Network (WLAN) system according to an IEEE 802.11 family of standards.

90. A wireless communications system, comprising:
a plurality of user terminals, wherein each user terminal is configured to select an index indicative of information to be conveyed in a UL signal, divide a code sequence corresponding to the index into subsequences, wherein the code sequence comprises a Walsh sequence, transmit the subsequences as a plurality of orthogonal frequency-division multiplexed (OFDM) symbols in an OFDM frame such that a plurality of OFDM frames are simultaneously transmitted by the plurality of user terminals; and
an access point (AP) configured to receive the plurality of OFDM frames and, for each received OFDM frame in the plurality of OFDM frames, extract code subsequences from the plurality of OFDM symbols, correlate the subsequences with reference code sequences, and determine the one or more code sequences from the correlation, determine timing information based on the correlation and on when the plurality of OFDM frames was received by the AP, and transmit the timing information such that the plurality of user terminals may use the timing information for each of the plurality of user terminals to control start times of subsequent uplink (UL) transmissions to be simultaneously received by the AP.

91. The system of claim 90, wherein the plurality of user terminals are differentiated through quadrature phase-shift keying (QPSK) scrambling.

* * * * *